March 30, 1965

H. S. STOLTZFUS 3,175,668

ENSILAGE DISTRIBUTOR

Filed Feb. 28, 1963

INVENTOR
HENRY S. STOLTZFUS

BY
ATTORNEYS

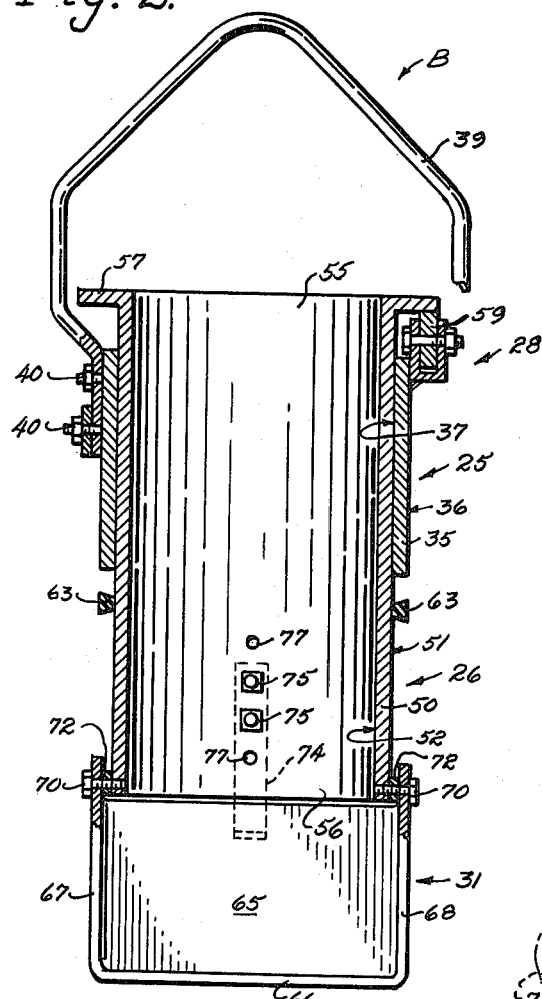
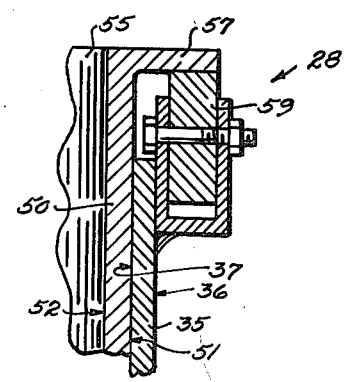
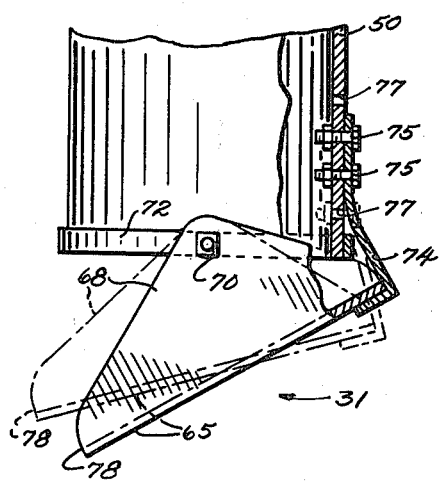
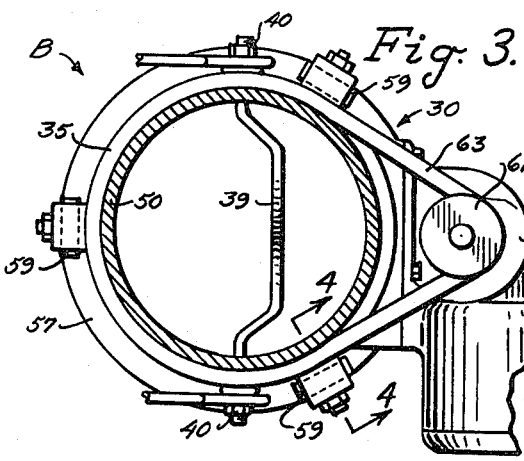

… …

3,175,668
ENSILAGE DISTRIBUTOR
Henry S. Stoltzfus, Rte. 1, Mount Joy, Pa.
Filed Feb. 28, 1963, Ser. No. 261,711
2 Claims. (Cl. 193—3)

This invention relates to improvements in ensilage distributors.

In today's modern farming, the emphasis is on large volume production and efficiency is the key word. As relates to the storage of ensilage, the problem is to provide for the high speed continuous feeding of ensilage into the storage container, coupled with proper distribution of the ensilage within the container.

If ensilage is fed directly from a delivery tube into a storage container, such as a silo, a veritable mountain of ensilage is built up within the container, with the apex thereof immediately beneath the discharge spout of the ensilage delivery tube. Such delivery tubes usually discharge ensilage substantially centrally of the container, with the result that the heavier material usually accumulates centrally of the container, and the lighter materials gravitate toward the outermost reaches thereof. This manner of distribution does not provide for proper sealing of the ensilage and is likely to result in air pockets within the stored material.

I realize that others have previously attempted to solve this problem of ensilage distribution by various means, however, the ensilage distributors previously provided do not meet the qualifications of equipment which is necessary for today's modern farming. For instance, the ensilage distributors previously provided require either some form of modification of the ensilage delivery tube, can be used only with a specific form of ensilage delivery tube, or rely upon the ensilage flow for the movement of the distributor which is necessary to assure proper distribution of the ensilage within the container.

The primary object of my invention is thus the provision of an ensilage distributor which is suitable for use in today's high volume modern farming procedures and is adapted for attachment to conventional ensilage delivery tubes. As a matter of fact, my improved ensilage distributor may be readily attached to any ensilage delivery tube, and is of sufficiently light weight so that it may be moved from one ensilage storage position to another with ease.

A further object is the provision of an ensilage distributor which is driven by a motor in a manner for accurate distribution of ensilage within a container without dependence upon grain flow.

A further object is the provision of an ensilage distributor which does not interfere with ensilage flow from the delivery tube, and is without interfering structure which might cause such delivery tube to clog.

A further object is the provision of an ensilage distributor having an adjustable deflector which permits the same to properly distribute the ensilage within the container regardless of the size of the container.

A further object is the provision of an ensilage distributor having a compact and unitary construction whereby likelihood of mechanical breakdown is rendered remote.

Other objects and advantages of the invention will be apparent during the course of the following detailed description, taken in connection with the accompanying drawings, forming a portion of this specification and in which drawings:

FIG. 2 is an enlarged vertical sectional view taken substantially on the line 2—2 of FIG. 1.

FIG. 3 is an enlarged horizontal sectional view taken substantially on the line 3—3 of FIG. 1.

FIG. 4 is an enlarged sectional view taken substantially on the line 4—4 of FIG. 3.

FIG. 5 is a fragmentary view, partly in section, of the lowermost portion of my ensilage distributor, showing the movable characteristics of the ensilage deflector thereof.

Figure 1:
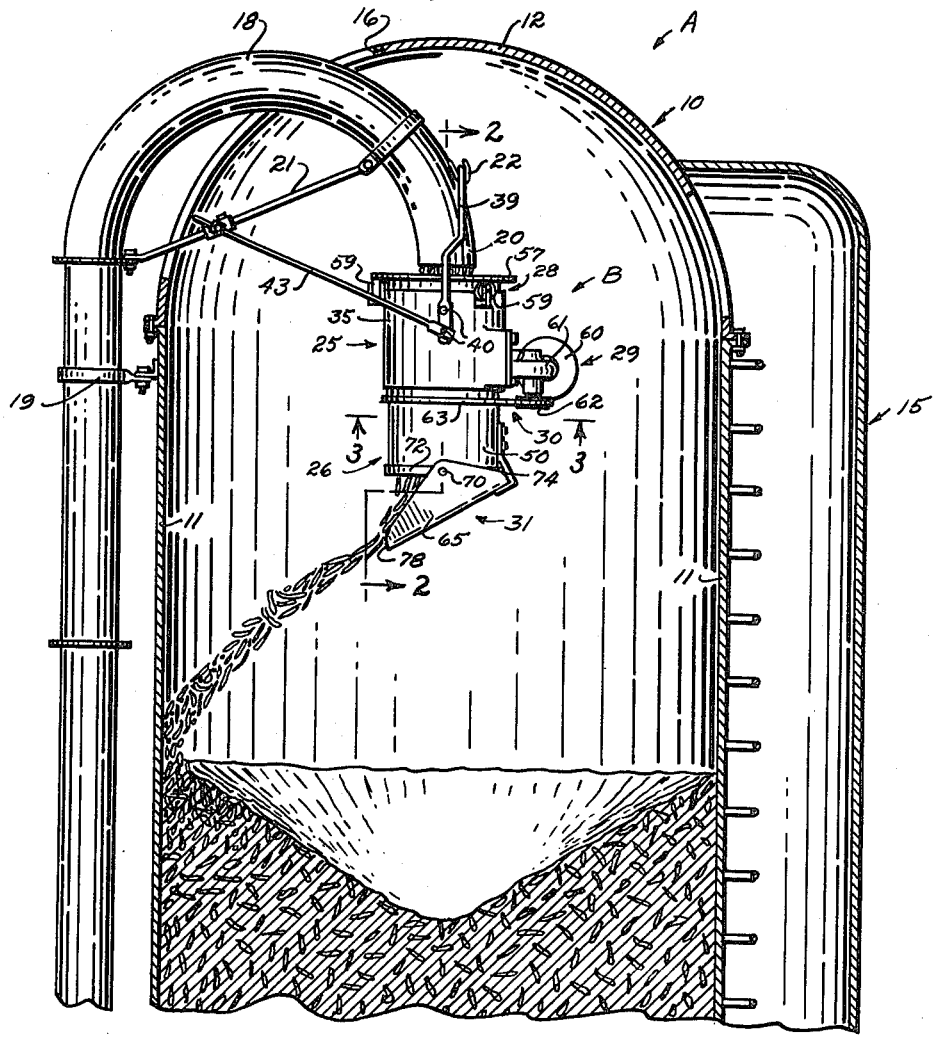
FIG. 1 is a vertical sectional view taken through a silo and showing my improved ensilage distributor attached to the delivery tube of an ensilage elevator.

In the drawings, wherein for the purpose of illustration is shown a preferred embodiment of the invention, and wherein similar reference characters designate corresponding parts throughout the several views, the letter A may generally designate an ensilage storage container, and B my improved ensilage distributor.

The ensilage storage container A may be of any convenient construction, the same being shown in the drawings as comprising a cylindrical silo 10 having side walls 11 and a cover portion 12. A ladderway 15 may be provided for access to the interior of the silo 10, as is conventional. An opening 16 is provided in the cover portion 12 for the introduction to within the silo of the delivery tube 18 of an ensilage elevator (not shown). Any suitable brace 19 may be provided for attaching the delivery tube 18 in proper position for discharge to within the silo 10. The discharge end 20 of the delivery tube 18 is usually braced, such as by cross brace 21, so that high speed flow of the ensilage through the delivery tube will not cause deflection of the same within the silo 10. Most conventional ensilage delivery tubes are provided with a hook-like projection 22 adjacent the discharge end 20 thereof, so that various equipment may be attached to the discharge end, according to the use to which the delivery tube is to be put. For instance, such hook-like portion 22 may be utilized for other purposes than for the attachment of my improved ensilage distributor, such as dust inhibitors, flow control devices, strainers, etc.

It will thus be seen that the ensilage storage container to which my improved ensilage distributor may be attached may be of any conventional type, it not being necessary to specially construct or modify the delivery tube thereof in order to accommodate my improved ensilage distributor.

My improved ensilage distributor B preferably includes tubular collar means 25, tubular casing means 26, means 28 for rotatably supporting the tubular casing means 26 within the tubular collar means 25, motor means 29 mounted upon the tubular collar means 25, means 30 interconnecting the motor means 29 and the tubular casing means 26 for rotation thereof with respect to the tubular collar means 25, and deflector means 31 mounted upon the ensilage discharge end of the tubular casing means 26 in juxtaposition for distribution of ensilage peripherally of the tubular casing means 26.

Tubular collar means 25 preferably comprises an elongated cylindrical body portion 35 having an outer periphery 36 and an inner surface 37. A bail 39 is preferably secured to the periphery 36 of collar means 35 in a fixed position, such as by bolts 40, which bail 39 extends vertically above the collar means 25, in juxtaposition for attachment about the hook-like portion 22 of the ensilage delivery tube 18. A suitable brace 43 may be attached in an interconnecting position between the tubular collar means 25 and the brace 21 of the delivery tube 18. The collar means 25 is thus secured in a fixed position with respect to the discharge spout 20 of the ensilage delivery tube 18.

Tubular casing means 26 preferably comprises an elongated cylindrical body portion 50 having a peripheral surface 51 and an inner surface 52. The peripheral surface 51 thereof is preferably of only slightly smaller diameter than the diameter of inner surface 37 of collar means 25, so that tubular casing means 26 may be snugly received within tubular casing means 25. The outer peripheral surface 51 of tubular casing means 26 is preferably in rotative abutment with inner surface 37 of tubular collar means 25, such rotative abutment serving to provide a guide for the rotation of the tubular casing means 26. Such rotative abutment of the periphery 51 of tubular casing means 26 with the inner surface 37 of tubular collar means 25 forms a part of the means for rotatably supporting the tubular casing means 26 within tubular collar means 25.

The tubular casing means 26 has an ensilage receiving end 55, extending to one end of tubular collar means 25, and an ensilage discharge end 56 extending to the other end of tubular collar means 25.

The ensilage receiving end 55 of tubular casing means 26 is preferably provided with a peripherally flanged portion 57. Rollers 59 are preferably mounted upon collar means 25, which rollers extend outwardly of one end of tubular collar means 25, to a position of rotative abutment with flange 57 of tubular casing means 26. The rotative abutment of the rollers 59 with flange 57 provides the other portion of the means 28 for rotatably supporting the tubular casing means 26 within the tubular collar means 25.

Motor means 29 may be of any conventional construction, the same being illustratively shown as comprising a motor 60 to which is attached a gear reducer 61, having a power output pulley 62.

The means 30 may comprise any conventional mechanical couple between the motor means 29 and tubular casing means 26, for rotation of tubular casing means 26 with respect to tubular collar means 25. As illustrated in the drawings, I have shown the means 30 as comprising a belt 63 which is entrained about the pulley 62 and directly abuts the peripheral surface 51 of tubular casing means 26. The tubular casing means 26, being of an extremely large diameter in relation to the pulley 62, provides sufficient surface area so that the belt efficiently contacts the same for rotation thereof in accordance with the rotation of pulley 62. Likewise, by this arrangement I avoid the provision of any external projections about the periphery of tubular casing means 26, so that in the event the same is required to be removed from tubular collar means 25, it is only necessary to remove the belt 63 and deflector means 31.

Deflector means 31 preferably includes a chute-like body portion 65 having a bottom portion 66 and side portions 67 and 68. The chute-like body portion 65 is preferably pivotally attached to the tubular casing means 26 by means of bolts 70 interconnected to the side portions 67 and 68 thereof. In order to provide added strength for the tubular casing means 26, adjacent the point of interconnection of the deflector means 31 thereto, I may provide a brace strap 72.

To one end of the chute-like body portion 65 is attached a flexible connecting brace 74. This connecting brace 74 is preferably attached to the tubular casing means 26 by means of bolts 75. A plurality of aligned openings 77 are provided in tubular casing means 26, so that brace means 74 may be attached to the tubular casing means 26 in various positions. As shown in FIG. 5, when the brace 74 is attached to the tubular casing means 26 to the centrally provided openings 77, the discharge end 78 of deflector means 31 is at a certain fixed angular relationship with respect to the discharge end 56 of tubular casing means 26. As shown in dot and dash lines in FIG. 5, this angular relationship of the deflector means 31 with respect to the tubular casing means 26 may be changed by attachment of the brace 74 to tubular casing means 26 through others of the openings 77. Such adjustment is necessary in order to provide adaptation of the ensilage distributor to ensilage containers of various diameters. For instance, if the diameter of the ensilage container is very large, the brace 74 will be interconnected through the lowermost openings 77 providing a rather flat trajectory of the ensilage from the discharge end 78 of the deflector means 31, so that the ensilage is propelled from the ensilage distributor in a more horizontal plane, to abutment with the walls of the ensilage container, whereas if the ensilage container is of a smaller diameter, the brace 74 may be interconnected to the tubular casing means 26 through others of the openings 77, for a more vertical trajectory for ensilage through the ensilage discharge end 78 of deflector means 31. As shown in FIG. 1, this deflector means 31 provides a trajectory to the ensilage whereby the same will abut against the walls of the ensilage container, with the result that the heavier materials of the ensilage will tend to collect about the walls thereof, providing an ensilage seal, and the lighter elements of the ensilage will gravitate toward the center of the ensilage container.

In operation, the bail 39 is attached to the hook-like portion 22, and brace 43 interconnected between brace 21 and the tubular collar means 25; the motor 60 is started, which imparts rotation to the tubular casing means 26; and ensilage is then delivered by the ensilage elevator through the delivery tube 18. It will be noted that there are no projections within the tubular casing 26, adjacent the discharge end 20 of the delivery tube 18, and that there will therefore be no clogging of the delivery tube 18 by the ensilage distributor. The ensilage flows through the tubular casing 26, into abutment with the deflector means 31, whereupon it is deflected toward the ensilage container walls. Inasmuch as the tubular casing 26 is continuously rotating, the deflector means 31 rotating therewith, the ensilage will be distributed circumferentially about the outer walls of the ensilage container.

When one ensilage container has been filled, and the flow of ensilage stopped, the motor 60 is merely deactivated, brace 43 disconnected, and the entire ensilage distributor may be removed from this storage container and placed in position for use in the next storage container to be filled.

Various changes in the shape, size and arrangement of parts may be made to the form of the invention herein shown and described, without departing from the spirit of the invention or the scope of the following claims.

I claim:

1. In an ensilage distributor, the combination of tubular collar means, tubular casing means having an ensilage receiving end and an ensilage discharge end, said tubular collar means being of substantially elongated cylindrical construction and extending for a substantial distance longitudinally of and peripherally of said tubular casing means, the inner surface of said tubular collar means being in rotative abutment with the peripheral surface of said tubular casing means in juxtaposition for guiding rotative movement of said tubular casing means with respect to said tubular collar means, means for rotatably supporting said tubular casing means within said tubular collar means, motor means mounted upon said collar means, means interconnecting said motor means and said tubular casing means for rotation of said tubular casing means with respect to said tubular collar means, said tubular casing means extending a substantial distance outwardly of one end of said tubular collar means, said means interconnecting said motor means and said tubular casing means comprising a drive belt having driven engagement with said motor means and drive engagement directly with the outer periphery of said tubular casing means at a portion thereof extending outwardly of one end of said tubular collar means, and deflector means mounted upon said ensilage discharge end of said tubular casing means in juxtaposition for distribution of ensilage peripherally of said tubular casing means, said deflector means including attaching means for interconnection of said deflector means to said tubular casing means in juxtaposition for angular pivotal movement of said deflector means with respect to said tubular casing means and including means for fixedly securing said deflector means to said tubular casing means in a predetermined pivotal position for angular deflection of ensilage from said tubular casing means in relationship to the positioning of the outermost walls of the ensilage container from the ensilage distributor.

2. In an ensilage distributor, the combination of tubular collar means, tubular casing means having an ensilage receiving end and an ensilage discharge end, said tubular collar means being of substantially elongated cylindrical construction and extending for a substantial distance longitudinally of and peripherally of said tubular casing means, means for rotatably supporting said tubular casing means within said tubular collar means, motor means mounted upon said collar means, means interconnecting said motor means and said tubular casing means for rotation of said tubular casing means with respect to said tubular collar means, said tubular casing means extending a substantial distance outwardly of one end of said tubular collar means, said means interconnecting said motor means and said tubular casing means comprising a drive belt having driven engagement with said motor means and drive engagement directly with the outer periphery of said tubular casing means at a portion thereof extending outwardly of one end of said tubular collar means, and deflector means mounted upon said ensilage discharge end of said tubular casing means in juxtaposition for distribution of ensilage peripherally of said tubular casing means, said deflector means including attaching means for interconnection of said deflector means to said tubular casing means in juxtaposition for angular pivotal movement of said deflector means with respect to said tubular casing means and including means for fixedly securing said deflector means to said tubular casing means in a predetermined pivotal position for angular deflection of ensilage from said tubular casing means in relationship to the positioning of the outermost walls of the ensilage container from the ensilage distributor.

References Cited by the Examiner
UNITED STATES PATENTS

| | | | |
|---|---|---|---|
| 1,923,460 | 8/33 | Sands | 302—60 |
| 2,449,592 | 9/48 | Daddario | 302—60 X |
| 2,690,827 | 10/54 | Wiggins | 193—3 |
| 2,808,295 | 10/57 | Caron | 302—60 |

HUGO O. SCHULZ, *Primary Examiner.*